Apr. 17, 1923.
J. K. HOLBROOK ET AL
1,451,774
TWO-COLOR PHOTOGRAPHY
Filed June 22, 1921
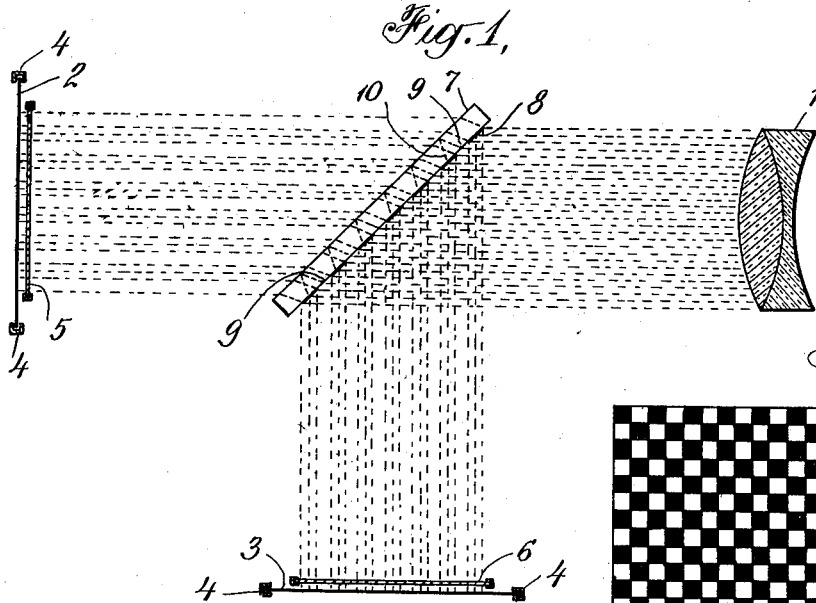
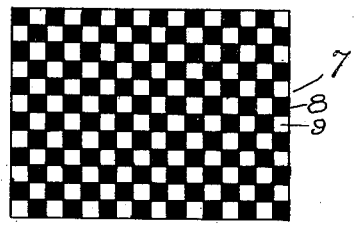
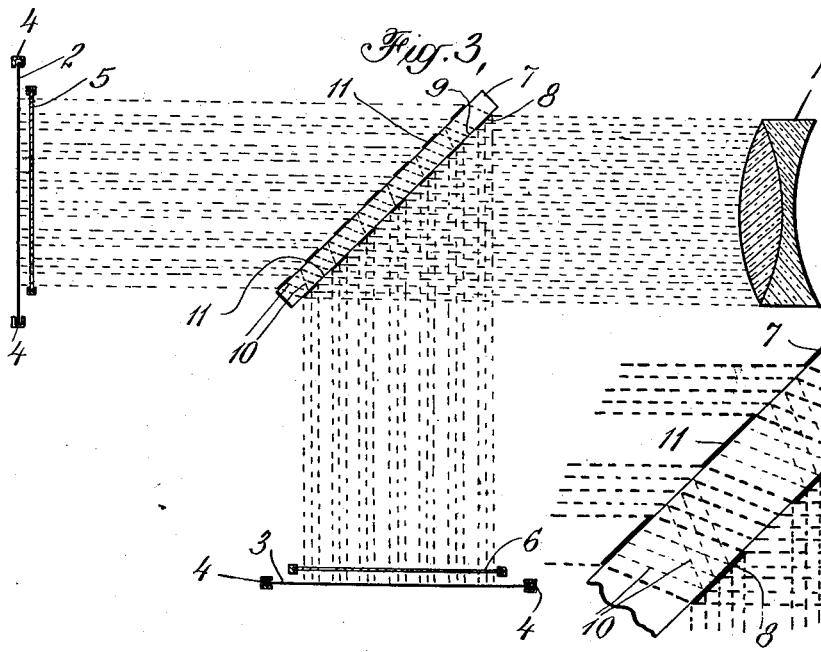
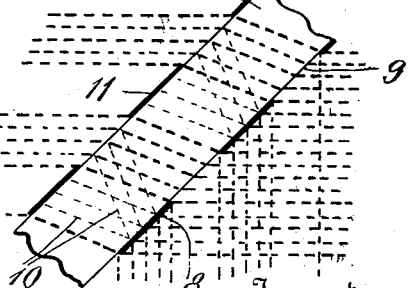
Inventors
John Knight Holbrook
Marshall De Francisco
By their Attorneys
Pennie, Davis, Marvin & Edmonds.

Patented Apr. 17, 1923.

1,451,774

UNITED STATES PATENT OFFICE.

JOHN KNIGHT HOLBROOK, OF NEW YORK, N. Y., AND MARSHALL DE FRANCISCO, OF JERSEY CITY HEIGHTS, NEW JERSEY, ASSIGNORS TO D. S. PLUMB, OF EAST ORANGE, NEW JERSEY.

TWO-COLOR PHOTOGRAPHY.

Application filed June 22, 1921. Serial No. 479,641.

*To all whom it may concern:*

Be it known that we, JOHN KNIGHT HOLBROOK and MARSHALL DE FRANCISCO, both citizens of the United States, residing, respectively, in New York city, New York, and Jersey City Heights, New Jersey, have invented certain new and useful Improvements in Two-Color Photography; and we do hereby declare the following to be a full, clear, and exact description of the invention, such as will enable others skilled in the art to which it appertains to make and use the same.

In the art of two-color photography, particularly in motion picture work, it is known to associate a light splitting mirror with two photographically sensitive receiving surfaces so that an image is formed on each simultaneously. A color screen is placed in front of each surface so that two images taken at precisely the same instant of time are obtained through complementary color screens. This is a marked improvement over the former method of taking successive pictures on a single strip of film through successive color screens of complementary color.

In order to form these two separate images simultaneously on two separate strips of film it has been proposed to use various arrangements of prisms which split up the light rays by refraction and project two separate images. Such prisms eliminate the double image on a single sensitive receiving surface but are subject to inaccuracies due to lack of uniformity in the mirror deposit: furthermore, they are of extremely delicate optical construction. It has also been proposed to mount a light splitting mirror in a casing which is filled with a liquid having about the same index of refraction as the glass in the mirror so as to minimize the bending of the light by refraction, such liquids as glycerine, castor oil, etc., having been used. Such an apparatus is obviously subject to the same practical difficulties and a good deal of the light would be absorbed in passing through the liquid medium. It has also been proposed to use a light splitting mirror where one surface of the mirror is provided with silvered portions and clear portions, the light from the lens passing through the clear portions on to the film to form one image, while the rest is reflected through 90° on to a second film to form a second image. If the silvered surface is on the back of the supporting medium, usually glass, it is obvious that another image is formed by reflection from the front surface which destroys the primary reflected image for practical purposes.

According to this invention, the formation of the undesirable secondary images is effectively prevented by locating the reflecting spots of a light-splitting surface or medium on the front or anterior surface thereof, that portion toward the incoming light, and by making the size and shape of these reflecting spots such that rays reflected from the back surface of the medium are screened from passing laterally out of the medium, by contacting against the reverse side of these opaque reflecting spots.

The invention consists essentially in a light splitting surface or medium provided with clear portions and silvered portions arranged preferably in checkerboard pattern, such silvered portions being on the front of the medium or toward the incoming light, and being made of such a size and shape with respect to the clear portions and with respect to the thickness of the glass of the medium that the reverse sides of the silvered portions intercept the light rays reflected from the back surface of the medium and so prevent rays reflected from the back surface thereof from passing out laterally and forming the above described secondary image. The thickness of the glass, its index of refraction and the angle at which the glass is to be put, will determine the quadrilateral formation of the checkerboard squares. This light-splitting device may be conveniently designated a light splitting mirror.

The internally reflected rays that contact the reverse side of the silvered portions would tend to be again reflected on to the film directly back of the lens and might tend to form an undesirable secondary image on that film. As a matter of practice such doubly reflected rays would be pretty well diffused and absorbed, and the intensity of such rays would be very much diminished by the time they reached the film, inasmuch as they have been twice reflected and, therefore, the intensity of this secondary image would be practically negligible. However, in a modified form of this invention, opaque portions of the same size as the silvered portions may be put on the back of the mirror in such a position as to screen such doubly reflected rays from passing on to the film directly back of the lens and forming another secondary image there. However, as has been stated this is hardly necessary in practice because only about one per cent of the light coming in through the lens tends to form such an image and is so faint that it would not affect the film; furthermore, such light is so diffused that practically its effect is negligible.

In the accompanying drawings there is illustated diagrammatically the essential features of the invention. Fig. 1 shows the light splitting mirror as mounted in relation to the lens and the two films; Fig. 2 is a plan view of the light splitting mirror; Fig. 3 is a view similar to Fig. 1 showing a modified form; and Fig. 4 is an enlarged view showing the path of the light rays in more detail.

Referring to the drawings, 1 indicates a lens which may be of any desired design, 2 indicates a photographic sensitive surface arranged directly back of the lens, and 3 another similar surface positioned at substantially right angles to the first, both of the surfaces being so situated with respect to the lens that clear images will be formed on them after the light has passed through the light splitting device that will be described.

The surfaces 2 and 3 may be motion picture films and are guided in appropriate guideways 4. Color screens 5 and 6 are placed in front of each film, the two screens being of course of different colors, 5 for instance being a red screen and 6 a green screen. The choice of color for these two screens forms no part of the invention.

A light splitting mirror 7 is mounted at an angle of about 45° to the axis of the lens. This light splitting mirror consists of a piece of clear glass the anterior side of which, that is to say that side toward the lens, is provided with silvered portions or spots 8 scattered uniformly over its surface, the intervening parts 9 of the mirror being simply clear glass. The total area of the silvered portions of the mirror here shown is about equal to that of the clear portions but this area relationship may, of course, be varied at will depending upon how much light it is desired to project through the respective color screens. With the mirror shown in Fig. 2 it is evident that about one-half of the light rays will pass straight through the mirror and form an image on the film 2, while the other half will be reflected from the silvered spots on the mirror through an angle of 90° to form an image on the film 3. It may again be stated that the showing is more or less diagrammatic.

It should be noted that the silvered spots 8 are on the front of the mirror. However, unless the size and shape of these silvered spots are carefully chosen, it has been found that certain of the light rays that pass through the clear portions 9 of the mirror are reflected by internal reflection from the back surface of the mirror through an angle of 90° and form a fainter secondary image on the film 3. This secondary image is usually formed a little to one side of the primary image and while fainter then the primary image, due to the fact that a relatively small quantity of light is internally reflected as above described, nevertheless spoils the definition of the primary image and renders it photographically impractical. The essential object of this invention is to provide a light splitting mirror that absolutely prevents the formation of such undesirable secondary images.

To this end, the silvered portions 8 on the front of the mirror are made of such a size and shape with relation to the thickness of the glass and its index of refraction, and are so placed with respect to the clear portions 9 of the mirror that any rays that pass through the clear portions and are internally reflected from the back of the mirror contact against the back or reverse side of the silvered portions and so are effectively prevented from passing on laterally out of the mirror. This stopping or screening of these rays, therefore, prevents the formation of the above described undesirable secondary images.

The preferred pattern for the silvered and clear portions is a checkerboard pattern, as shown in Fig. 2, where the silvered portions 8 are of substantially the same size and shape as the clear portions, the silvered portions being uniformly interspersed among the clear portions. With usual glass thicknesses the length of the axially situated 45° angle edge of one of the silvered rectangles approximates the thickness of the glass of of the mirror. With such a pattern the internally reflected rays, indicated at 10, reflected from the back of the mirror, contact against the back or reverse side of the silvered squares and so the formation of a secondary image by these rays is effectively prevented.

The internally reflected rays, after they contact against the reverse side of one of the silvered portions 8, would be reflected again and practically would be lost in diffusion and absorption.

Complete screening of any such rays may be effected in practice by providing opaque portions 11 on the back of the mirror 7 as shown in Fig. 3. These opaque portions 11 are of the same size and arranged in the same pattern as the silvered portions 8. It is evident that these opaque spots effectively prevent further reflection of the internally reflected rays 10. As a matter of practice, however, it is not necessary to use the spots 11 on the back of the mirror because practically such rays are lost by diffusion and absorption; in its preferred and simpler form the mirror simply has the silvered spots 8 on the front of the mirror.

While a checkerboard pattern is found to be practical in this situation, it should be understood that the size and pattern of the silvered spots may be varied, as long as they are of such a size and are so positioned that they effectively prevent the formation of secondary images on the film 3 by reflection from the back surface of the mirror. The word "film" as used in the claims, of course, is understood to cover any photographically sensitive surface.

It is also to be understood that the films need not necessarily be set at an angle of 90° to each other. Other angles may be chosen and the position of the mirror shifted accordingly.

We claim:

1. A camera for use in two-color photography, comprising a lens, means for supporting two films at right angles to one another, a color screen in front of each film and a light splitting medium arranged at an angle of about 45° to the incoming light, said medium being provided with silvered portions and clear portions, with the silvered portions on the front thereof toward the incoming light, the silvered portions being of such a shape and size with respect to the clear portions and with respect to the thickness of the glass of the said medium as to prevent the lateral projection of rays reflected from the back of said medium.

2. A camera for use in two-color photography, comprising a lens, means for supporting two films at right angles to one another, a color screen in front of each film and a light splitting surface or medium arranged at an angle of about 45° to the incoming light, the surface or medium being provided with clear portions and silvered portions arranged in a checkerboard pattern, with the silvered portions on the front of the medium toward the incoming light, the silvered portions being of such a size with respect to the thickness of the glass of the medium as to prevent lateral projection of rays of light reflected from the back thereof.

3. A light splitting medium for use in two-color photography having clear portions and silvered portions, the silvered portions being on the front surface thereof toward the incoming light and being of such a size with relation to the thickness of the medium as to prevent the lateral projection of rays reflected from the back of the medium.

4. A light splitting glass mirror for use in two-color photography having clear and silvered portions arranged in checkerboard pattern, the silvered portions being on the front surface thereof toward the incoming light and being of such a size with relation to the thickness of the glass as to prevent the lateral projection of rays reflected from the back thereof.

5. A light splitting medium for use in two-color photography having clear portions and silvered portions, the silvered portions being on the front surface thereof toward the incoming light and being of such size with relation to the thickness of the glass of the medium as to prevent the lateral projection of rays reflected from the back of the medium and opaque portions corresponding in size to the silvered portions, on the back of the said medium positioned so as to screen rays that have been doubly reflected from the back of the medium and from the reverse side of the silvered portions.

6. A light splitting medium for use in two-color photography having clear portions and silvered portions arranged in a checkerboard pattern, the silvered portions being on the front surface of the medium toward the incoming light and being of such a size with relation to the thickness of the material forming the medium as to prevent the lateral projection of rays reflected from the back thereof, and opaque portions arranged in similar checkerboard pattern on the back of the medium, positioned so as to screen rays that have been doubly reflected from the back of the medium and from the reverse side of the silvered portions.

7. In a camera for use in two-color photography having supports for two films at an angle to each other, the combination of a light splitting mirror provided with transparent areas and opaque light reflecting areas on its forward surface, the mirror being placed at such an angle relative to the incoming light and the film supports that a part of the light is transmitted to one film and a part reflected to the other, the position of the light reflecting areas being such as to intercept any light reflected from the rear surface of the mirror.

In testimony whereof we affix our signatures.

JOHN KNIGHT HOLBROOK.
MARSHALL DE FRANCISCO.